United States Patent
Kashiyama et al.

(10) Patent No.: US 11,254,355 B2
(45) Date of Patent: Feb. 22, 2022

(54) ELECTRONIC CONTROL DEVICE, CONTROL METHOD, AND NON-TRANSITORY COMPUTER READABLE MEDIUM

(71) Applicants: Kei Kashiyama, Aichi (JP); Tomohiro Sakata, Aichi (JP); Yoshihisa Yamada, Aichi (JP)

(72) Inventors: Kei Kashiyama, Aichi (JP); Tomohiro Sakata, Aichi (JP); Yoshihisa Yamada, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 113 days.

(21) Appl. No.: 16/658,788

(22) Filed: Oct. 21, 2019

(65) Prior Publication Data
US 2020/0189650 A1    Jun. 18, 2020

(30) Foreign Application Priority Data

Dec. 14, 2018    (JP) .............................. JP2018-234510

(51) Int. Cl.
*B62D 6/02*    (2006.01)
*B62D 5/04*    (2006.01)

(52) U.S. Cl.
CPC ......... *B62D 5/0463* (2013.01); *B62D 5/0481* (2013.01); *B62D 6/02* (2013.01)

(58) Field of Classification Search
CPC ....... B62D 5/0463; B62D 6/02; B62D 5/0481
See application file for complete search history.

(56) References Cited

U.S. PATENT DOCUMENTS

| | | | |
|---|---|---|---|
| 2004/0148075 A1* | 7/2004 | Bullister | H02J 7/1438 701/41 |
| 2006/0012323 A1 | 1/2006 | Endo et al. | |
| 2017/0106898 A1* | 4/2017 | Sakaguchi | B62D 6/04 |
| 2018/0339727 A1* | 11/2018 | Ueyama | B62D 5/0409 |

FOREIGN PATENT DOCUMENTS

| | | |
|---|---|---|
| JP | S62-29465 A | 2/1987 |
| JP | 2006-36087 A | 2/2006 |

* cited by examiner

*Primary Examiner* — Mathew Franklin Gordon
(74) *Attorney, Agent, or Firm* — Osha Bergman Watanabe & Burton LLP

(57) ABSTRACT

An electronic control device controls an electronic power steering apparatus including a motor configured to assist steering of a steering wheel provided in a vehicle and a torque sensor configured to detect a steering torque applied to the steering wheel. The electronic control device includes: a torque current control unit that sets a first current command value to be supplied to the motor according to a value of the steering torque applied to the steering wheel; a differential control unit that calculates a torque differential value as a differential value of the steering torque and sets a second current command value according to the torque differential value and a rotation speed of the motor; and a command value calculation unit that calculates a motor current command value to be supplied to the motor based on the first current command value and the second current command value.

17 Claims, 11 Drawing Sheets

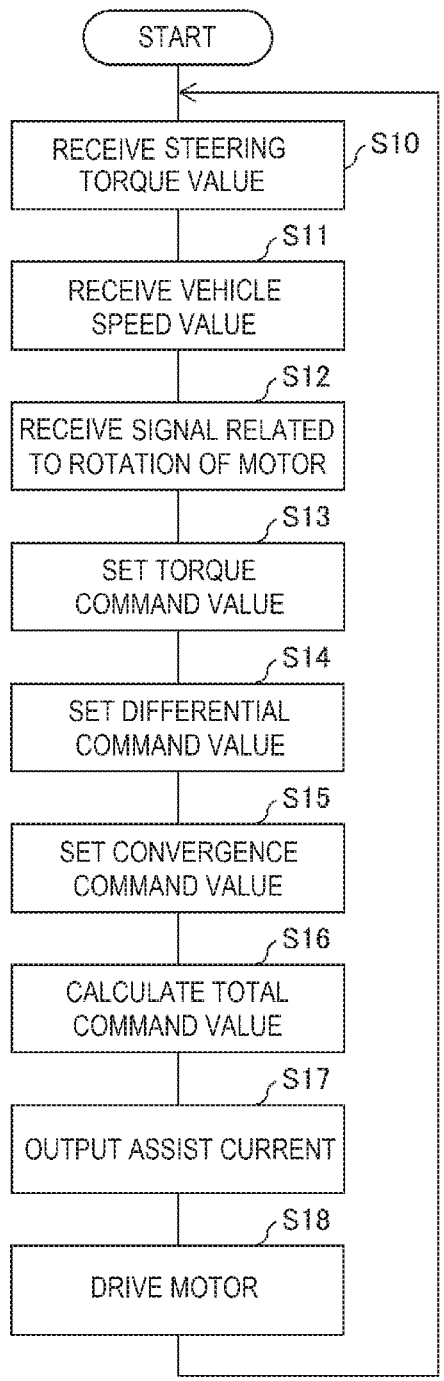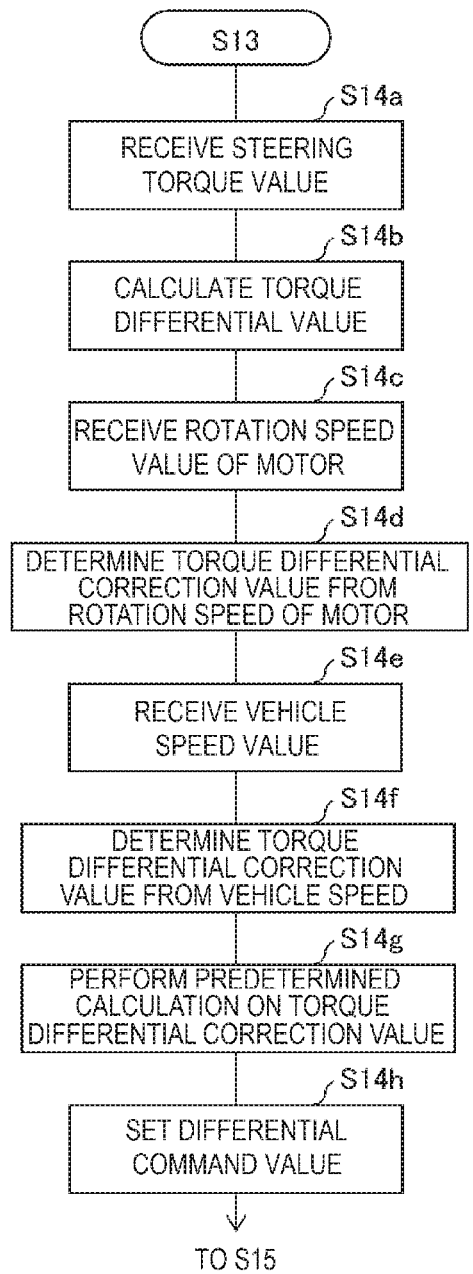

ELECTRONIC CONTROL DEVICE, CONTROL METHOD, AND NON-TRANSITORY COMPUTER READABLE MEDIUM

CROSS-REFERENCES TO RELATED APPLICATIONS

This application is based upon and claims the benefit of priority from Japanese Patent Application No. 2018-234510, filed on Dec. 14, 2018; the entire contents of which are incorporated herein by reference.

FIELD

One or more embodiments of the present invention relate to an electronic control device, a control method, and a non-transitory computer readable medium.

BACKGROUND

An electronic power steering apparatus capable of preventing a vibration of a steering wheel of a vehicle is known as a technique in the related art. For example, JP-A-2006-036078 discloses an electronic power steering apparatus capable of preventing a torque ripple by providing a smoothing filter in a current control system and smoothing quantization errors using the smoothing filter. However, responsiveness of control by the electronic power steering apparatus may be deteriorated due to the smoothing of quantization errors.

Further, JP-A-S62-029465 discloses an electronic power steering apparatus that performs correction using a differential value of a torque when calculating a target assist torque value. The electronic power steering apparatus can immediately respond to a variation of the torque by adding a correction value based on the differential value of the torque to the target assist torque value, and thus steering responsiveness can be improved. However, in a case where the torque value varies, the corrected target assist torque value also varies, and as a result, a vibration of the steering wheel is likely to occur.

SUMMARY

In a case where an output of the torque sensor is digitally processed, quantization errors occur, and as a result, a steering torque value varies. Further, a variation of the steering torque value is caused by a vibration of an engine of the vehicle, a vibration of the vehicle, a shaking of a driver's hand when a driver of the vehicle touches the steering wheel, a variation of the power supply voltage, noise generated from an ECU, noise by another electronic device (an alternator, a motor, another ECU, or the like), spark noise from an engine spark plug, or noise due to static electricity. In a case where the steering torque value varies in this way, even when the steering wheel is not steered by the driver, a steering force is assisted, and this causes a vibration of the steering wheel. As a result, the driver feels uncomfortable.

As described above, in the electronic power steering apparatuses disclosed in JP-A-2006-036078 and JP-A-S62-029465, there is a problem that it is difficult to simultaneously realize improvement of steering responsiveness when the steering wheel is steered and prevention of a vibration of the steering wheel when the steering wheel is held.

An object of one an aspect of the invention is to prevent a vibration of the steering wheel due to a variation of the steering torque when the steering wheel is held while improving steering responsiveness when the steering wheel is steered.

In order to solve the above problems, according to an aspect of the invention, there is provided an electronic control device that controls an electronic power steering apparatus including a motor configured to assist steering of a steering wheel provided in a vehicle and a torque sensor configured to detect a steering torque applied to the steering wheel, the electronic control device including: a torque current control unit that sets a first current command value to be supplied to the motor according to a value of the steering torque applied to the steering wheel; a differential control unit that calculates a torque differential value as a differential value of the steering torque and sets a second current command value according to the torque differential value and a rotation speed of the motor; and a command value calculation unit that calculates a motor current command value to be supplied to the motor based on the first current command value and the second current command value.

According to this configuration, for example, there is considered a case where the differential control unit sets the second current command value when the rotation speed of the motor is low to be smaller than the second current command value when the rotation speed of the motor is high. In this case, the differential control unit can correct the motor current command value to be supplied to the motor when the rotation speed of the motor is low and the steering wheel is held to be smaller than the motor current command value when the rotation speed of the motor is high and the steering wheel is steered. Therefore, it is possible to prevent a vibration of the steering wheel due to a variation of the steering torque when the steering wheel is held while improving steering responsiveness when the steering wheel is steered.

The differential control unit may correct the torque differential value according to the rotation speed, and set the second current command value according to the corrected torque differential value. According to this configuration, the second current command value is a value based on the torque differential value according to the rotation speed of the motor. Thereby, it is possible to set the second current command value according to the rotation speed of the motor.

In a case where the rotation speed is lower than a first threshold value, the differential control unit may correct the torque differential value to 0 when the torque differential value is smaller than a first differential threshold value. According to this configuration, in a case where noise is included in a signal of the torque sensor, when the steering wheel is held, the torque differential value becomes a value close to 0, and thus the torque differential value can be corrected to 0 when the steering wheel is held. Therefore, as the torque differential value is corrected to 0, the second current command value can be set to 0.

In a case where the rotation speed is lower than a first threshold value, the differential control unit may set the second current command value to 0 when the torque differential value is smaller than a first differential threshold value. According to this configuration, in a case where noise is included in a signal of the torque sensor, when the steering wheel is held, the torque differential value becomes a value close to 0, and thus the second current command value is set to 0 when the steering wheel is held. Therefore, it is possible to prevent a vibration of the steering wheel due to a variation of the steering torque when the steering wheel is held.

In a case where the rotation speed is lower than a first threshold value, the differential control unit may set a degree to which the torque differential value is corrected to be small when the torque differential value is smaller than a first differential threshold value to be larger than a degree to which the torque differential value is corrected to be small when the torque differential value is equal to or larger than the first differential threshold value.

According to this configuration, in a case where noise is included in a signal of the torque sensor, the torque differential value becomes a value close to 0 when the steering wheel is held. Here, there is considered a case where the differential control unit sets a degree to which the torque differential value is corrected to be small when the torque differential value is smaller than the first differential threshold value to be larger than a degree to which the torque differential value is corrected to be small when the torque differential value is equal to or larger than the first differential threshold value. In this case, when the steering wheel is held, the torque differential value can be corrected to be smaller than the torque differential value when the steering wheel is steered.

In a case where the rotation speed is lower than a first threshold value, the differential control unit may set a degree to which the second current command value is corrected to be small when the torque differential value is smaller than a first differential threshold value to be larger than a degree to which the second current command value is corrected to be small when the torque differential value is equal to or larger than the first differential threshold value and smaller than a second differential threshold value.

According to this configuration, in a case where noise is included in a signal of the torque sensor, the torque differential value becomes a value close to 0 when the steering wheel is held. Here, there is considered a case where the differential control unit sets a degree to which the second current command value is corrected to be small when the torque differential value is smaller than the first differential threshold value to be larger than a degree to which the second current command value is corrected to be small when the torque differential value is equal to or larger than the first differential threshold value and smaller than the second differential threshold value.

In this case, when the steering wheel is held, the motor current command value to be supplied to the motor can be corrected to be smaller than the motor current command value when the steering wheel is steered. Therefore, it is possible to prevent a vibration of the steering wheel due to a variation of the steering torque when the steering wheel is held.

In a case where the rotation speed is lower than a first threshold value, the differential control unit may set the second current command value to 0 only when the torque differential value is 0. According to this configuration, in a case where the torque differential value is within a range close to 0, when the torque differential value is a value other than 0, the second current command value can be set to a value other than 0.

Therefore, a range in which the second current command value is cut can be minimized, and thus steering responsiveness when the steering wheel is steered can be improved as much as possible. Further, it is possible to prevent a vibration of the steering wheel due to a variation of the steering torque when the steering wheel is held.

The differential control unit may correct the torque differential value by multiplying the torque differential value by a predetermined gain, and set a value of the gain when the rotation speed is lower than a first threshold value to be smaller than a value of the gain when the rotation speed is equal to or higher than the first threshold value.

According to this configuration, since the rotation speed of the motor is related to a steering speed of the steering wheel, in a case where the steering wheel is held or in a case where the steering speed of the steering wheel is low, the rotation speed of the motor becomes low. As the rotation speed of the motor becomes lower, a value of a differential gain becomes smaller Therefore, a value of the gain when the steering wheel is held is smaller than a value of the gain when the steering wheel is not held. Thereby, the corrected torque differential value can be kept low when the steering Wheel is held, and the second current command value can also be kept low.

The differential control unit may set a degree to which the second current command value is corrected to be small when the rotation speed is lower than a first threshold value to be larger than a degree to which the second current command value is corrected to be small when the rotation speed is equal to or higher than the first threshold value.

According to this configuration, in a case of the torque differential value having a certain value, the second current command value when the steering wheel is held is corrected to be smaller than the second current command value when the steering wheel is not held. Thereby, the second current command value can be kept low when the steering wheel is held. Therefore, it is possible to prevent a vibration of the steering wheel due to a variation of the steering torque when the steering wheel is held while improving steering responsiveness when the steering wheel is steered.

The differential control unit may correct the torque differential value by multiplying the torque differential value by a predetermined gain, and in a case where the rotation speed is lower than a first threshold value, set a value of the gain when the torque differential value is smaller than a first differential threshold value to be smaller than a value of the gain when the torque differential value is equal to or larger than the first differential threshold value.

According to this configuration, in a case where noise is included in a signal of the torque sensor, the torque differential value becomes a value close to 0 when the steering wheel is held. Here, there is considered a case where the differential control unit sets a value of the gain when the torque differential value is smaller than a first differential threshold value to be smaller than a value of the gain when the torque differential value is equal to or larger than the first differential threshold value. In this case, when the steering wheel is held, the torque differential value can be corrected to be smaller than the torque differential value when the steering wheel is steered.

The differential control unit may set the second current command value when the rotation speed is lower than a first threshold value to be smaller than the second current command value when the rotation speed is equal to or higher than the first threshold value, the second current command value corresponding to the torque differential value having a certain value smaller than a first differential threshold value.

According to this configuration, in a case where noise is included in a signal of the torque sensor, when the steering wheel is held, the torque differential value becomes a value close to 0, and the rotation speed of the motor becomes a value close to 0. Here, there is considered a case where the differential control unit sets the second current command value when the rotation speed of the motor is lower than a first threshold value to be smaller than the second current command value when the rotation speed of the motor is equal to or higher than the first threshold value, the second current command value corresponding to the torque differential value having a certain value smaller than a first differential threshold value.

In this case, when the steering wheel is held, the motor current command value to be supplied to the motor can be corrected to be smaller than the motor current command value when the steering wheel is steered. Therefore, it is possible to prevent a vibration of the steering wheel due to a variation of the steering torque when the steering wheel is held.

Further, in a case where the steering wheel is held, when there is no noise, the torque differential value is ideally 0. On the other hand, even when the torque differential value exceeds 0 due to noise caused by, for example, a quantization error of the torque sensor, the motor current command value to be supplied to the motor can be corrected to be smaller, and thus it is possible to reduce an influence by the quantization error of the torque sensor.

The differential control unit may include a switching processing unit that performs switching between a plurality of tables for setting the second current command value according to the rotation speed. According to this configuration, for example, there is considered a case where the switching processing unit performs switching between the tables so as to select a table in which the second current command value is set to be low when the rotation speed of the motor is low and so as to select a table in which the second current command value is set to be high when the rotation speed of the motor is high.

In this case, the differential control unit can correct the motor current command value to be supplied to the motor when the rotation speed of the motor is low and the steering wheel is held to be smaller than the motor current command value when the rotation speed of the motor is high and the steering wheel is steered. Therefore, it is possible to prevent a vibration of the steering wheel due to a variation of the steering torque when the steering wheel is held while improving steering responsiveness when the steering wheel is steered.

The differential control unit may preset a value of the gain when the rotation speed is lower than a first threshold value and a value of the gain when the rotation speed is equal to or higher than the first threshold value, according to a plurality of vehicle speeds of the vehicle. According to this configuration, the second current command value can be set according to the plurality of vehicle speeds of the vehicle, and thus the motor current command value to be supplied to the motor can be corrected. Therefore, it is possible to optimally prevent a vibration of the steering wheel according to the plurality of vehicle speeds of the vehicle.

The differential control unit may include a determination unit that determines one second current command value from a plurality of the second current command values according to a vehicle speed of the vehicle. According to this configuration, the second current command value is determined according to the vehicle speed of the vehicle, and thus it is possible to prevent a vibration of the steering wheel according to the vehicle speed of the vehicle.

The differential control unit may set the second current command value when the rotation speed is lower than a first threshold value to be decreased as the rotation speed decreases, and set the second current command value when the rotation speed is equal to or higher than the first threshold value to be constant, the second current command value corresponding to the torque differential value having a certain value.

According to this configuration, when the steering wheel is held, the second current command value can be kept low as the rotation speed of the motor decreases. Therefore, it is possible to prevent a vibration of the steering wheel due to a variation of the steering torque when the steering wheel is held while improving steering responsiveness when the steering wheel is steered.

According to another aspect of the invention, there is provided a control method for controlling an electronic power steering apparatus including a motor configured to assist steering of a steering wheel provided in a vehicle and a torque sensor configured to detect a steering torque applied to the steering wheel, the control method including: setting a first current command value to be supplied to the motor according to a value of the steering torque applied to the steering wheel; calculating a torque differential value as a differential value of the steering torque and setting a second current command value according to the torque differential value and a rotation speed of the motor; and calculating a motor current command value to be supplied to the motor based on the first current command value and the second current command value.

According to still another aspect of the invention, there is provided a non-transitory computer readable medium that stores an electronic control program for causing a computer to function as the electronic control device, the program, when executed by a processor, causing the computer to function as: the torque current control unit; the differential control unit; and the command value calculation unit.

According to the aspects of the invention, it is possible to prevent a vibration of the steering wheel due to a variation of the steering torque when the steering wheel is held while improving steering responsiveness when the steering wheel is steered.

BRIEF DESCRIPTION OF DRAWINGS

FIG. 4A is a flowchart illustrating an example of processing contents of the electronic power steering apparatus illustrated in FIG. 1, and FIG. 4B is a flowchart illustrating an example of processing contents of the differential control unit illustrated in FIG. 1;

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

First Embodiment

Figure 1:
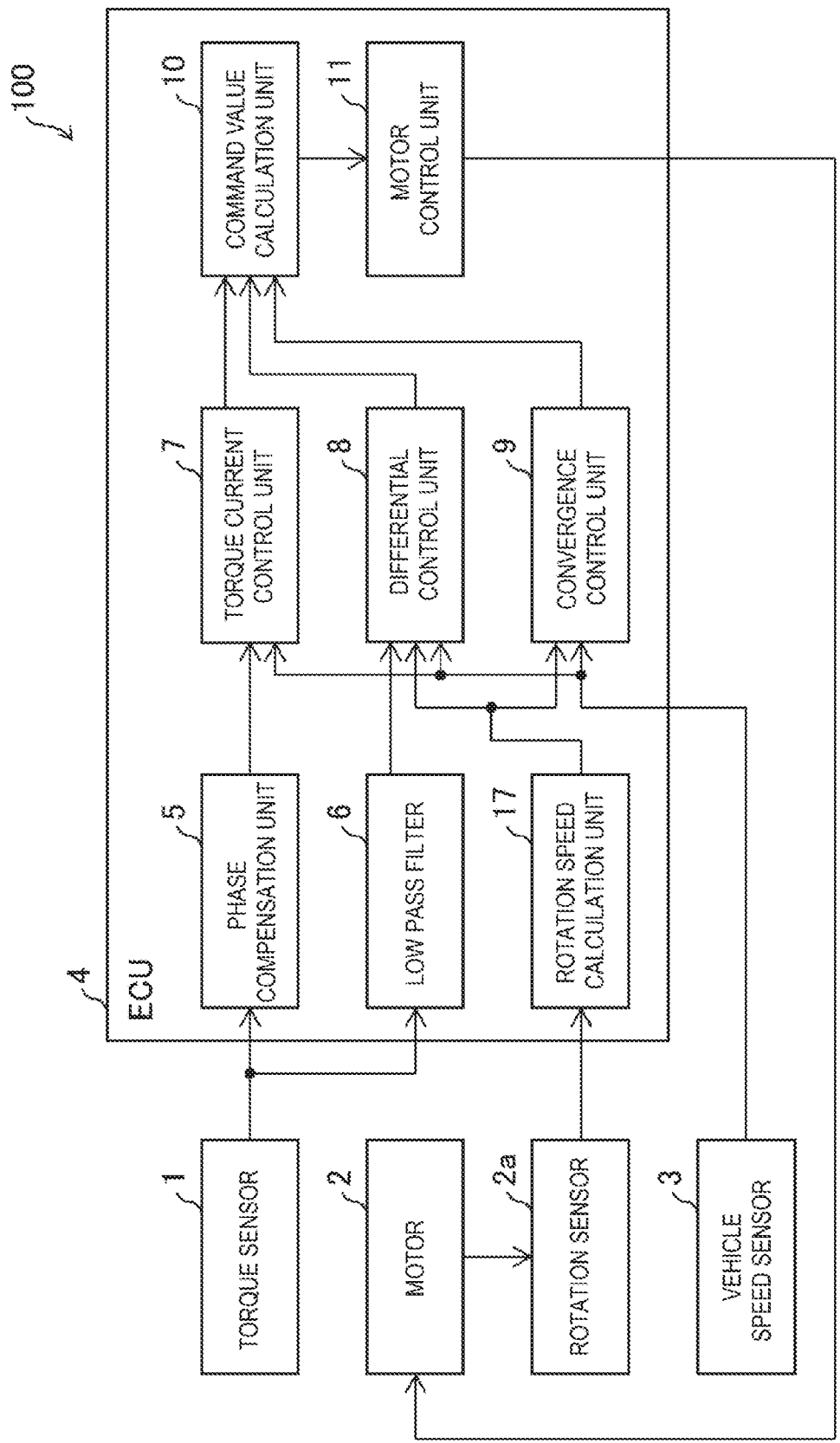
FIG. 1 is a block diagram illustrating an example of a schematic configuration of an electronic power steering apparatus according to a first embodiment of the invention.

Hereinafter, a first embodiment of the invention will be described with reference to FIG. 1. FIG. 1 is a block diagram illustrating an example of a schematic configuration of an electronic power steering (EPS) apparatus 100 according to a first embodiment of the invention. As illustrated in FIG. 1, the electronic power steering apparatus 100 includes a torque sensor 1, a motor 2, a vehicle speed sensor 3, an electronic control unit (ECU) 4, and a rotation sensor 2a.

The electronic power steering apparatus 100 is an apparatus that applies a steering assist force to assist a steering force of a driver to a steering wheel by applying a rotation force of the motor 2 to a steering shaft (not illustrated) coupled to the steering wheel (not illustrated) provided in a vehicle via a reduction gear (not illustrated). The electronic power steering apparatus 100 may be an electronic power steering apparatus configured to apply a rotation force of the motor 2 to a pinion or a rack instead of the steering shaft.

The present inventors have found the following fact. Even when a vibration is generated in the steering wheel, in a case where the steering Wheel is steered, a driver is not much concerned about the vibration. On the other hand, when the steering wheel is held, in a case where a slight vibration is generated in the steering wheel, a driver is concerned about the vibration.

The torque sensor 1 detects a steering torque applied to the steering wheel. The steering torque is one of variation values required for controlling the motor 2. The torque sensor 1 supplies the detected steering torque to the ECU 4. The torque sensor 1 is provided on the steering shaft.

The motor 2 assists steering of the steering wheel. In other words, the motor 2 applies a steering assist force to the steering wheel. The motor 2 is connected to a reduction gear. The motor 2 supplies information on rotation of the motor 2 to a rotation speed calculation unit 17 of the ECU 4 via the rotation sensor 2a such as a resolver or a magneto resistive (MR) sensor.

The rotation sensor 2a is provided on the motor 2, and outputs a signal corresponding to a rotation speed of the motor 2. An angle change signal from the rotation sensor 2a is given to the rotation speed calculation unit 17, and the rotation speed calculation unit 17 converts the angle change signal into a rotation speed. The rotation speed calculation unit 17 supplies information on the rotation speed of the motor 2 to a differential control unit 8 and a convergence control unit 9.

For example, in a case where the ECU 4 is integrated with the motor 2, information on the rotation speed of the motor 2 may be obtained from a magnetic sensor provided in the ECU 4. In addition, without providing the rotation sensor 2a, the rotation speed calculation unit 17 of the ECU 4 may calculate a rotation speed of the motor 2 based on a current of the motor 2 and a voltage change of a terminal of the motor 2. Further, in a case where the rotation sensor 2a is a resolver, the rotation sensor 2a is provided outside the ECU 4. On the other hand, in a case where the rotation sensor 2a is an MR sensor, the rotation sensor 2a is provided outside or inside the ECU 4. As the rotation speed of the motor 2, a rotation speed of the steering wheel may be used. It is assumed that the rotation speed of the motor 2 according to one or more embodiments of the invention includes the rotation speed of the steering wheel.

The vehicle speed sensor 3 detects a vehicle speed of the vehicle on which the electronic power steering apparatus 100 is mounted. The vehicle speed sensor 3 detects a vehicle speed of the vehicle, and supplies information on the detected vehicle speed to the ECU 4 by controller area network (CAN) communication.

The ECU 4 includes a phase compensation unit 5, a low pass filter 6, a torque current control unit 7, a differential control unit 8, a convergence control unit 9, a command value calculation unit 10, a rotation speed calculation unit 17, and a motor control unit 11. The ECU 4 is an electronic control device (EPS-ECU) that controls the electronic power steering apparatus 100. The ECU 4 is connected to the torque sensor 1, the motor 2, and the vehicle speed sensor 3.

The phase compensation unit 5 delays steering torque data supplied from the torque sensor 1, and supplies the delayed steering torque data to the torque current control unit 7. The low pass filter 6 eliminates high frequency components from the steering torque supplied from the torque sensor 1, and supplies the steering torque from which the high frequency components are eliminated to the differential control unit 8.

The torque current control unit 7 sets a torque command value (first current command value) to be supplied to the motor 2 by referring to a table according to a steering torque value supplied from the phase compensation unit 5 and a vehicle speed value supplied from the vehicle speed sensor 3. The table shows a relationship between a steering torque and a torque command value. A method of setting the torque command value is known, and thus the method will not be described in detail. The torque current control unit 7 supplies the torque command value which is set, to the command value calculation unit 10.

The differential control unit 8 corrects a total command value (motor current command value) determined according to the torque command value, which is set by the torque current control unit 7, in order to improve a steering feeling by improving steering assist responsiveness. The differential control unit 8 calculates a torque differential value as a differential value of the steering torque supplied from the low pass filter 6. The differential control unit 8 sets a differential command value (second current command value) according to the torque differential value, the rotation speed of the motor 2, and the vehicle speed supplied from the vehicle speed sensor 3. The differential control unit 8 supplies the differential command value which is set, to the command value calculation unit 10. Here, although the rotation speed of the motor 2 is described as the number of rotations of the motor 2, the rotation speed of the motor 2 includes a concept of an angular velocity of the motor 2.

Here, for example, there is considered a case where the differential control unit 8 sets a differential command value when the rotation speed of the motor 2 is low to be smaller than a differential command value when the rotation speed of the motor 2 is high. In this case, the differential control unit 8 can correct a total command value to be supplied to the motor 2 when the rotation speed of the motor 2 is low and the steering wheel is held to be smaller than a total command value when the rotation speed of the motor 2 is high and the steering wheel is steered. Therefore, it is possible to prevent a vibration of the steering wheel due to a variation of the steering torque when the steering wheel is held while improving steering responsiveness when the steering wheel is steered.

The convergence control unit 9 corrects the total command value in order to improve the steering feeling by quickly converging low-frequency vibrations due to the rotation of the steering wheel by applying an assist force in a direction opposite to the rotation direction of the steering wheel.

The convergence control unit 9 sets a convergence command value based on the rotation speed of the motor 2 supplied from the rotation speed calculation unit 17 and the vehicle speed supplied from the vehicle speed sensor 3. A method of setting the convergence command value is known, and thus the method will not be described in detail. The convergence control unit 9 supplies the convergence command value which is set, to the command value calculation unit 10. In the embodiment, the differential control unit 8 and the convergence control unit 9 refer to the rotation speed value of the motor 2. On the other hand, in a case where a steering speed is calculated based on information of a steering angle synchronized with the rotation of the motor 2, the steering speed value may be referred to.

The command value calculation unit 10 calculates a total command value by adding the torque command value supplied from the torque current control unit 7, the differential command value supplied from the differential control unit 8, and the convergence command value supplied from the convergence control unit 9. That is, the command value calculation unit 10 calculates a total command value to be supplied to the motor 2 based on the torque command value, the differential command value, and the convergence command value. The command value calculation unit 10 supplies the calculated total command value to the motor control unit 11, as a motor current to be supplied to the motor 2. The motor control unit 11 controls the motor 2.

Figure 2:
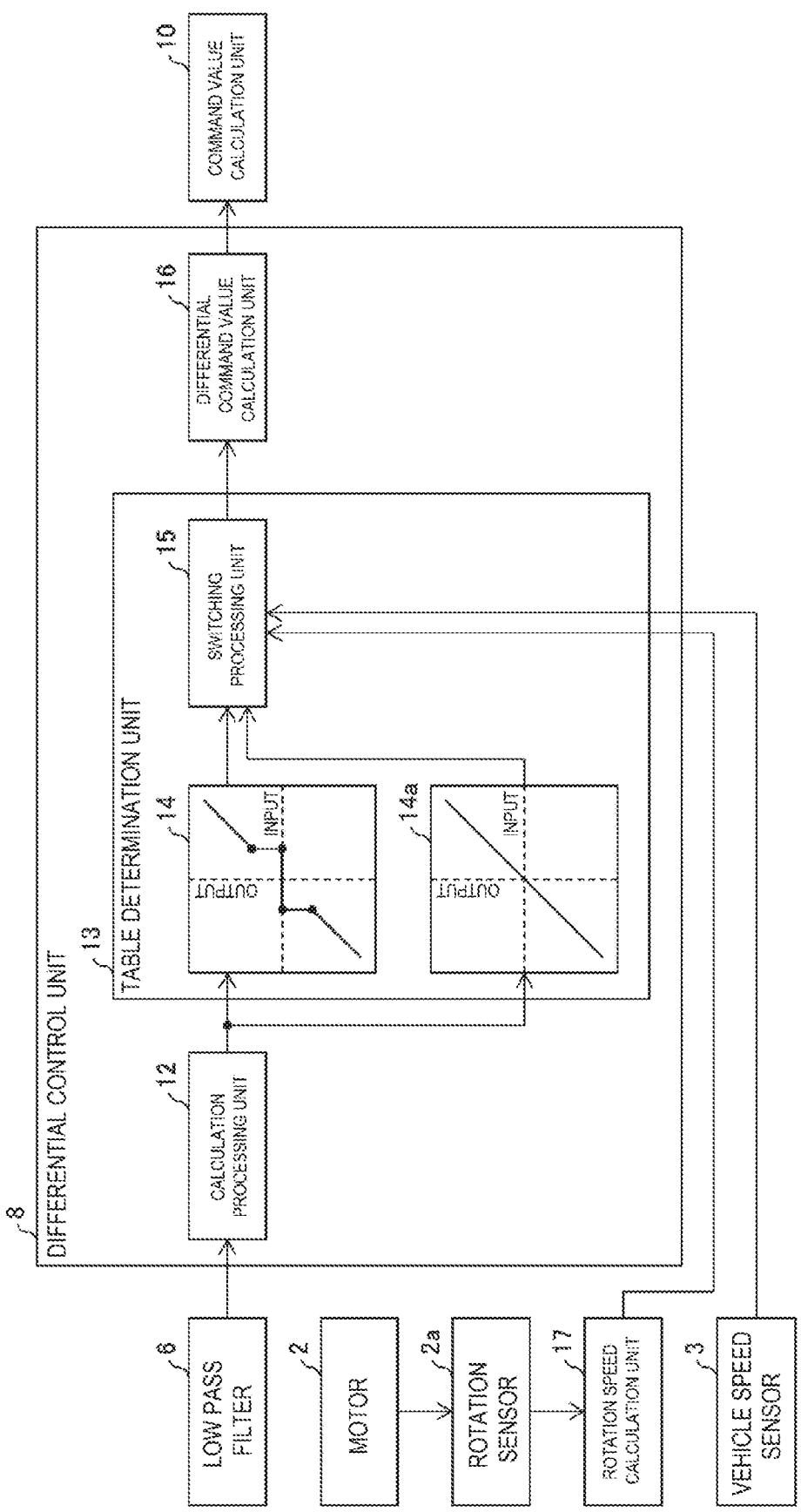
FIG. 2 is a block diagram illustrating an example of details of a differential control unit included in an ECU of the electronic power steering apparatus illustrated in FIG. 1.
Figure 3:
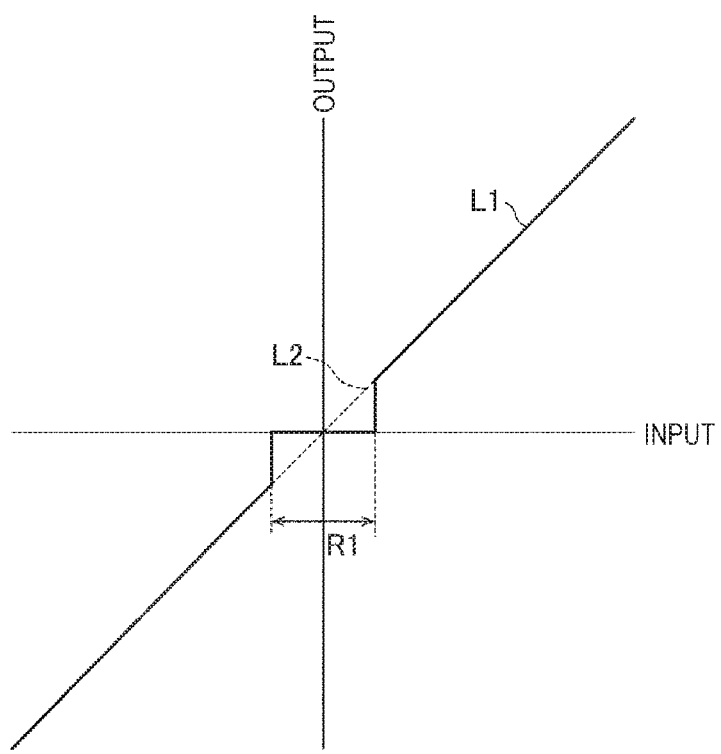
FIG. 3 is a graph illustrating an example of a table of a table determination unit included in the differential control unit illustrated in FIG. 2.

Next, details of the differential control unit 8 will be described with reference to FIGS. 2 and 3. FIG. 2 is a block diagram illustrating an example of details of the differential control unit 8 included in the ECU 4 of the electronic power steering apparatus 100 illustrated in FIG. 1. FIG. 3 is a graph illustrating an example of a table 14 of a table determination unit 13 included in the differential control unit 8 illustrated in FIG. 2.

As illustrated in FIG. 2, the differential control unit 8 includes a calculation processing unit 12, a table determination unit 13, and a differential command value calculation unit 16. The calculation processing unit 12 calculates, as the torque differential value, an approximate value of a differential value of the steering torque by digitally differentiating the steering torque supplied from the low pass filter 6. The calculation processing unit 12 supplies the calculated torque differential value to the table determination unit 13.

The table determination unit 13 includes tables 14 and 14a and a switching processing unit 15. The table determination unit 13 determines a torque differential correction value by correcting the torque differential value calculated by the calculation processing unit 12 with reference to the table 14 or the table 14a based on the rotation speed of the motor 2. The tables 14 and 14a are preset in the table determination unit 13. The torque differential correction value is a value obtained by multiplying the torque differential value by a differential gain (gain). The differential gain is a gain of a differential current included in the motor current to be supplied to the motor 2.

In this way, the differential control unit 8 corrects the torque differential value by multiplying the torque differential value by a predetermined differential gain. The tables 14 and 14a show a relationship between a torque differential value as an input and a torque differential correction value as an output, and the table determination unit 13 selects either one of the table 14 and the table 14a. The tables 14 and 14a may show a relationship between a torque differential value as an input and a differential gain as an output. A slope of a straight line drawn in the tables 14 and 14a indicates a differential gain value. In the tables 14 and 14a, a horizontal axis indicates a torque differential value as an input. In the tables 14 and 14a, a vertical axis indicates a torque differential correction value as an output.

In the table 14, as illustrated in FIG. 3, when the torque differential value is a value close to 0, the torque differential correction value as an output is 0. Specifically, when the torque differential value is within a predetermined numerical value range R1, the torque differential correction value is 0. In other words, the differential gain within the predetermined numerical value range R1 is 0. The predetermined numerical value range R1 is determined by an experimental result or a calculation, as a range in which noise desired to be removed can be removed from noise (quantization error or the like) included in the output of the torque sensor 1.

A fact that the torque differential value is within the predetermined numerical value range R1 means that the torque differential value is smaller than a first differential threshold value. In a case of comparing the torque differential value with the first differential threshold value, it is assumed that the torque differential value is an absolute value. That is, when the torque differential value is smaller than the first differential threshold value, the differential gain is set to 0, and the torque differential value is corrected to 0. Thus, the torque differential correction value is set to 0. Thereby, the differential command value output from the differential command value calculation unit 16 is also set to 0.

The differential command value calculation unit 16 calculates a differential command value used for correction of the total command value by performing a predetermined calculation on the torque differential correction value as an output of the table 14 or the table 14a. In other words, the differential command value calculation unit 16 converts the torque differential correction value into a differential command value by multiplying the torque differential correction value by a predetermined coefficient so as to obtain a current value to be supplied to the motor 2. The differential command value calculation unit 16 supplies the calculated differential command value to the command value calculation unit 10. Without providing the differential command value calculation unit 16, the differential command value may be directly output from the tables 14 and 14a by adjusting the differential gain of the tables 14 and 14a in advance.

As the torque differential correction value increases, the differential command value also increases. As the torque differential correction value decreases, the differential command value also decreases. In FIG. 3, a slope of a solid line L1 indicates a differential gain of the table 14 in a range where an absolute value of the torque differential value exceeds the predetermined numerical value range R1, and a value of the slope is "1". In the table 14a, the differential gain value is constant regardless of the magnitude of the torque differential value, and indicates "1".

The switching processing unit 15 refers to the rotation speed of the motor 2 and the vehicle speed supplied from the vehicle speed sensor 3. In this description, a numerical value of the rotation speed of the motor 2 and a numerical value of the vehicle speed, which are references for selection of the outputs of the tables by the switching processing unit 15, are examples. Here, a case where the switching processing unit 15 uses only the numerical value of the rotation speed of the motor 2, as a reference for selection of the outputs of the tables, will be described. In a case where the rotation speed of the motor 2 is equal to or higher than 0 rpm and lower than 1 rpm, the switching processing unit 15 selects the table 14 from the table 14 or the table 14a. That is, the torque differential value is corrected to the torque differential correction value based on the table 14, and the torque differential correction value is supplied to the differential command value calculation unit 16.

On the other hand, in a case where the rotation speed of the motor 2 is equal to or higher than 1 rpm, the switching processing unit 15 selects the output of the table 14a from the output of the table 14 and the output of the table 14a. That is, the output of the table 14a is supplied to the differential command value calculation unit 16. In a case where the rotation speed of the motor 2 is equal to or higher than 1 rpm and the differential gain is set to "1", the torque differential value is not practically corrected. For this reason, without using the table 14a, the switching processing unit 15 may output the torque differential value calculated by the calculation processing unit 12 as it is.

As described above, the switching processing unit 15 performs switching between a plurality of tables in which different differential gains are set according to the rotation speed of the motor 2. That is, the switching processing unit 15 performs switching between a plurality of tables for setting the differential command value according to the rotation speed of the motor 2. Here, for example, there is considered a case where the switching processing unit 15 performs switching between the tables so as to select a table in which the differential command value is set to be low when the rotation speed of the motor 2 is low and so as to select a table in which the torque differential value is not corrected when the rotation speed of the motor 2 is high.

In this case, the differential control unit 8 can correct a total command value to be supplied to the motor 2 when the rotation speed of the motor 2 is low and the steering wheel is held to be smaller than a total command value when the rotation speed of the motor 2 is high and the steering wheel is steered. Therefore, it is possible to prevent a vibration of the steering wheel due to a variation of the steering torque when the steering wheel is held while improving steering responsiveness when the steering wheel is steered.

Further, the differential control unit 8 corrects the torque differential value according to the rotation speed of the motor 2, and sets a differential command value according to the torque differential correction value as the corrected torque differential value. Therefore, the differential command value is a value based on the torque differential value according to the rotation speed of the motor 2. Thereby, it is possible to set the differential command value according to the rotation speed of the motor 2.

As described above, the table determination unit 13 determines the differential gain such that a value of the differential gain when the rotation speed of the motor 2 is lower than 1 rpm as the first threshold value is to be lower than a value of the differential gain when the rotation speed of the motor 2 is equal to or higher than 1 rpm as the first threshold value. Thereby, the differential gain can be kept low when the steering wheel is held. Therefore, it is possible to prevent a vibration of the steering wheel due to a variation of the steering torque when the steering wheel is held while improving steering responsiveness when the steering wheel is steered.

Further, in a case where the rotation speed of the motor 2 is lower than 1 rpm as the first threshold value, the differential control unit 8 sets the differential gain value when the torque differential value is smaller than the first differential threshold value to be smaller than the differential gain value when the torque differential value is equal to or larger than the first differential threshold value. That is, in the case where the rotation speed of the motor 2 is lower than 1 rpm as the first threshold value, the differential control unit 8 sets the differential command value when the torque differential value is smaller than the first differential threshold value to be smaller than the differential command value when the torque differential value is equal to or larger than the first differential threshold value.

Further, the differential control unit 8 sets the differential gain value when the rotation speed of the motor 2 is lower than 1 rpm as the first threshold value and the torque differential value is smaller than the first differential threshold value to be smaller than the differential gain value when the rotation speed of the motor 2 is equal to or higher than 1 rpm as the first threshold value and the torque differential value is smaller than the first differential threshold value. That is, the differential control unit 8 sets the differential command value when the rotation speed of the motor 2 is lower than 1 rpm as the first threshold value to be smaller than the differential command value when the rotation speed of the motor 2 is equal to or higher than 1 rpm as the first threshold value, the differential command value corresponding to the torque differential value having a certain value smaller than the first differential threshold value.

Here, in a case where the steering wheel is held, when noise is included in the signal of the torque sensor, the torque differential value becomes a value close to 0, and the rotation speed of the motor becomes a value close to 0. When the steering wheel is held, as compared with a case where the steering wheel is steered, the torque differential value can be corrected to be smaller, and the total command value to be supplied to the motor 2 can be corrected to be smaller. Therefore, it is possible to prevent a vibration of the steering wheel due to a variation of the steering torque when the steering wheel is held.

Further, in a case where the steering wheel is held, when there is no noise, the torque differential value is ideally 0. On the other hand, even when the torque differential value exceeds 0 due to noise caused by, for example, the quantization error of the torque sensor 1, the total command value to be supplied to the motor 2 can be corrected to be smaller, and thus it is possible to reduce an influence by the quantization error of the torque sensor 1.

Further, in the case where the rotation speed of the motor 2 is lower than 1 rpm as the first threshold value, the differential control unit 8 corrects the torque differential value to 0 when the torque differential value is smaller than the first differential threshold value. In this case, when the torque differential value is smaller than the first differential threshold value, the differential control unit 8 sets the differential command value to 0 since the torque differential correction value is 0. In a case where noise is included in the signal of the torque sensor, when the steering wheel is held, the torque differential value becomes a value close to 0, and thus the torque differential value can be corrected to 0 when the steering wheel is held. As the torque differential value is corrected to 0, the differential command value is set to 0. Therefore, it is possible to prevent a vibration of the steering wheel due to a variation of the steering torque when the steering wheel is held.

In the case where the rotation speed of the motor 2 is lower than 1 rpm as the first threshold value, when the torque differential value is smaller than the first differential threshold value, the differential control unit 8 corrects the torque differential value to be smaller. Further, in a case where the torque differential value is equal to or larger than the first differential threshold value, the differential control unit 8 does not correct the torque differential value, or corrects the torque differential value to be a value other than 0. Therefore, it is possible to prevent a vibration of the steering wheel due to a variation of the steering torque when the steering wheel is held.

Further, in the case where the rotation speed of the motor 2 is equal to or higher than 1 rpm as the first threshold value, the differential control unit 8 may not correct the torque differential value regardless of the magnitude of the torque differential value. Therefore, when the steering wheel is held, it is possible to prevent a vibration of the steering wheel due to a variation of the steering torque. On the other hand, when the steering wheel is rotated, steering assist responsiveness by the motor 2 can be prioritized than prevention of vibration.

Next, a case where the switching processing unit 15 uses the numerical value of the rotation speed of the motor 2 and the numerical value of the vehicle speed, as references for selection of the outputs of the tables, will be described. In a case where the vehicle speed is equal to or higher than 5 km/h, the switching processing unit 15 selects the output of the table 14a from the output of the table 14 and the output of the table 14a, regardless of the rotation speed of the motor 2. That is, the output of the table 14a is supplied to the differential command value calculation unit 16. In the table 14, in a case where the torque differential value is smaller than the first differential threshold value, the torque differential correction value becomes 0. On the other hand, in a case where the torque differential value is equal to or larger than the first differential threshold value, the torque differential correction value increases at a stretch, and the assist force to the steering wheel also changes at a stretch.

In a case where the vehicle speed is equal to or higher than 5 km/h, without using the table 14a, the switching processing unit 15 may output the torque differential value calculated by the calculation processing unit 12 as it is. In other words, in the case where the vehicle speed is equal to or higher than 5 km/h, the differential control unit 8 does not correct the torque differential value. Even in a case where a vibration occurs in the steering wheel, when the traveling speed of the vehicle is high, the driver is unlikely to notice the vibration, and thus responsiveness to a change in torque can be prioritized than prevention of vibration. Further, the switching processing unit 15 may perform processing of selecting one of the output of the table 14 and the output of the table 14a by using only the rotation speed value of the motor 2 without referring to the vehicle speed value. In second and subsequent embodiments, the same applies to the switching processing unit 15.

As illustrated in FIG. 3, in a case where the torque differential value is a value other than a value close to 0, a solid line L1 and a dotted line L2 match with each other. Thus, when the torque differential value is a value other than a value close to 0, the differential gain value of the table 14 and the differential gain value of the table 14a match with each other.

Next, processing contents of the electronic power steering apparatus 100 will be described with reference to FIGS. 4A and 4B. FIG. 4A is a flowchart illustrating an example of processing contents of the electronic power steering apparatus 100 illustrated in FIG. 1, and FIG. 4B is a flowchart illustrating an example of processing contents of the differential control unit 8 illustrated in FIG. 1.

First, the ECU 4 receives a steering torque value supplied from the torque sensor 1 (step S10). The steering torque value is input to the phase compensation unit 5 and the low pass filter 6 of the ECU 4. Further, the ECU 4 receives a vehicle speed value supplied from the vehicle speed sensor 3 (step S11). The vehicle speed value is input to the torque current control unit 7, the differential control unit 8, and the convergence control unit 9 of the ECU 4.

Further, the ECU 4 receives a signal related to rotation of the motor 2 supplied from the motor 2 via the rotation sensor 2a (step S12). The signal related to rotation of the motor 2 is input to the rotation speed calculation unit 17. The rotation speed calculation unit 17 calculates a rotation speed of the motor 2 based on the signal from the rotation sensor 2a, and supplies information on the rotation speed of the motor 2 to the differential control unit 8 and the convergence control unit 9.

Next, the torque current control unit 7 sets a torque command value based on the steering torque supplied from the torque sensor 1 via the phase compensation unit 5 and the vehicle speed supplied from the vehicle speed sensor 3 (step S13: step of setting a first current command value). The torque current control unit 7 supplies the torque command value which is set, to the command value calculation unit 10.

On the other hand, the differential control unit 8 sets a differential command value based on the torque differential value that is a differential value of the steering torque supplied from the torque sensor 1 via the low pass filter 6, the rotation speed of the motor 2 supplied from the rotation speed calculation unit 17, and the vehicle speed supplied from the vehicle speed sensor 3 (step S14: step of setting a second current command value). The differential control unit 8 supplies the differential command value which is set, to the command value calculation unit 10.

Hereinafter, the processing contents of the differential control unit 8 will be described with reference to FIG. 4B. First, the calculation processing unit 12 receives the steering torque value supplied from the torque sensor 1 via the low pass filter 6 (step S14a). The calculation processing unit 12 calculates the torque differential value (step S14b).

Further, the switching processing unit 15 receives the rotation speed value of the motor 2 supplied from the rotation speed calculation unit 17 (step S14c). The table determination unit 13 determines a torque differential correction value based on the rotation speed of the motor 2 (step S14d). Furthermore, the switching processing unit 15 receives the vehicle speed value supplied from the vehicle speed sensor 3 (step S14e).

The table determination unit 13 determines a torque differential correction value based on the vehicle speed value (step S14f). That is, the table determination unit 13 determines the torque differential correction value based on the rotation speed value of the motor 2 and the vehicle speed value. Processing of step S14f may be omitted. The table determination unit 13 supplies the determined torque differential correction value to the differential command value calculation unit 16. The differential command value calculation unit 16 performs a predetermined calculation on the torque differential correction value (step S14g). The differential control unit 8 sets, as a differential command value, a value obtained by performing a predetermined calculation on the torque differential correction value (step S14h).

Further, the convergence control unit 9 sets a convergence command value based on the rotation speed of the motor 2 supplied from the rotation speed calculation unit 17 and the vehicle speed supplied from the vehicle speed sensor 3 (step S15). The convergence control unit 9 supplies the convergence command value which is set, to the command value calculation unit 10.

The command value calculation unit 10 calculates a total command value by adding the torque command value supplied from the torque current control unit 7, the differential command value supplied from the differential control unit 8, and the convergence command value supplied from the convergence control unit 9 (step S16: step of calculating a motor current command value). The command value calculation unit 10 supplies the calculated total command value to the motor control unit 11. The motor control unit 11 sets an assist current as a motor current to be supplied to the motor 2 based on the total command value supplied from the command value calculation unit 10, and outputs the assist current to the motor 2 (step S17). The motor control unit 11 outputs the assist current to the motor 2 to drive the motor 2 (step S18).

Second Embodiment

Figure 5:
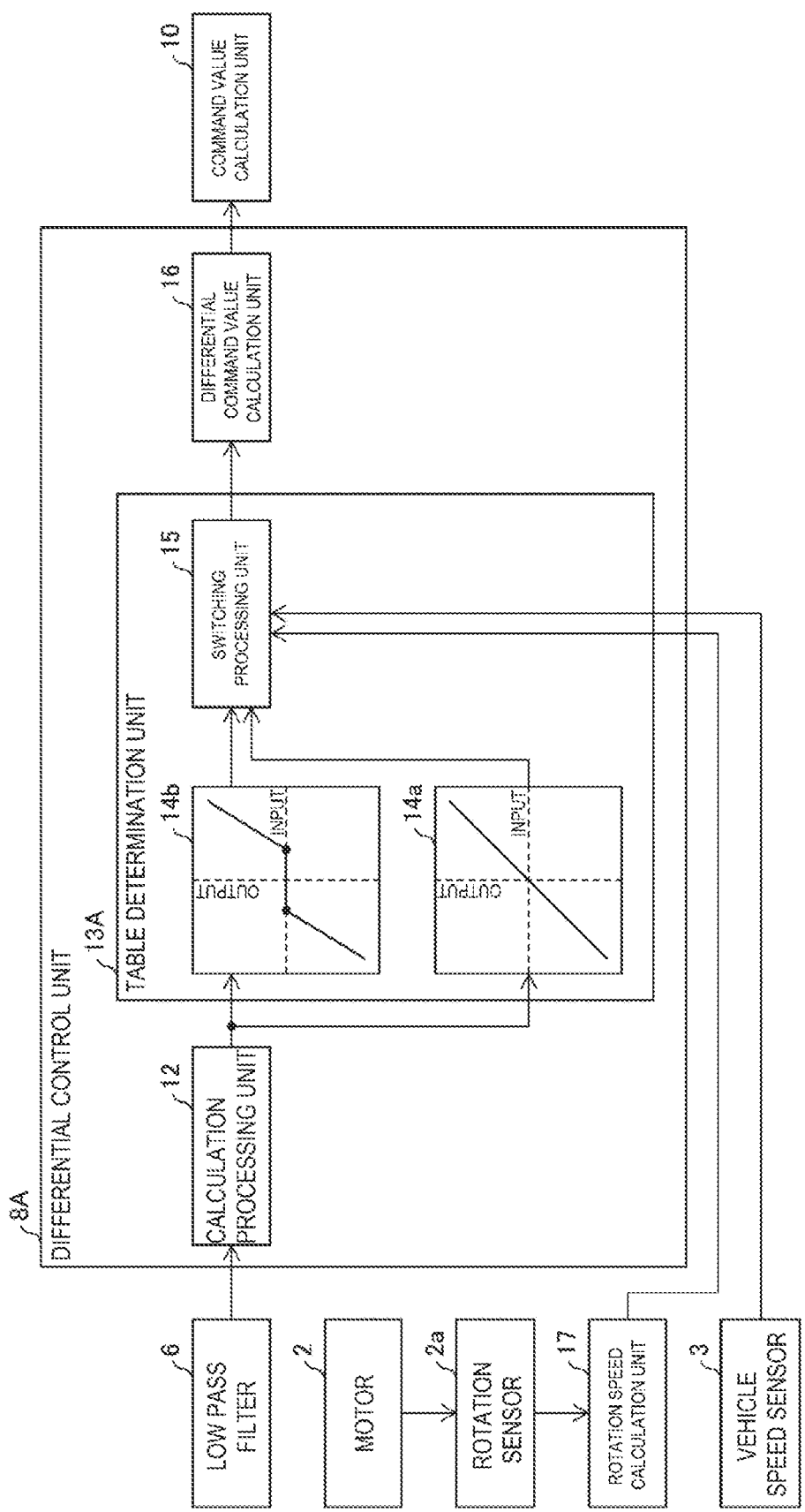
FIG. 5 is a block diagram illustrating an example of details of a differential control unit according to a second embodiment of the invention.
Figure 6:
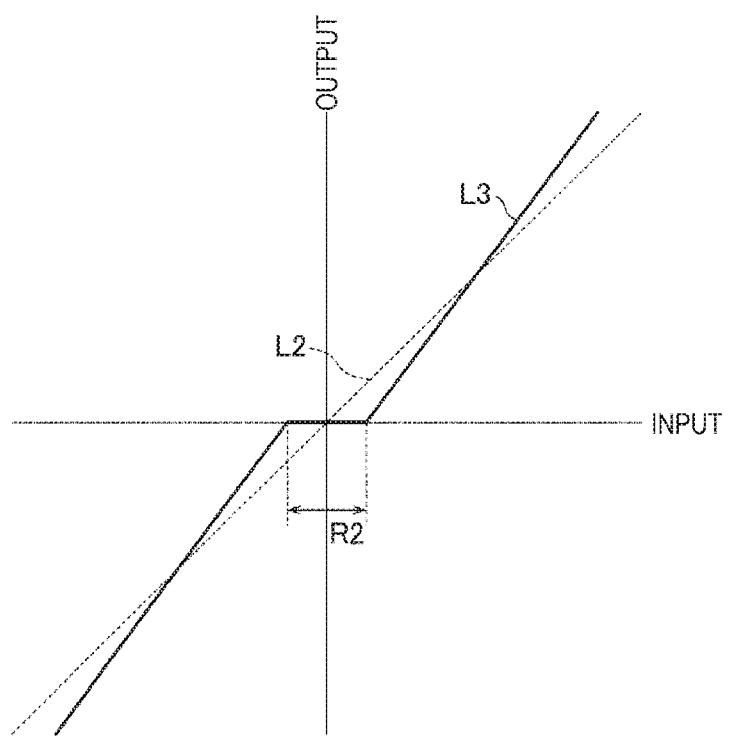
FIG. 6 is a graph illustrating an example of a table of a table determination unit included in the differential control unit illustrated in FIG. 5.

Hereinafter, another embodiment of the invention will be described with reference to FIGS. 5 and 6. For convenience of explanation, members having the same functions as those described in the embodiment are denoted by the same reference numerals, and a description thereof will not be repeated. FIG. 5 is a block diagram illustrating an example of details of a differential control unit 8A according to a second embodiment of the invention. FIG. 6 is a graph illustrating an example of a table of a table determination unit 13A included in the differential control unit 8A illustrated in FIG. 5.

As illustrated in FIG. 5, the differential control unit 8A is different from the differential control unit 8 in that the table determination unit 13 is changed to the table determination unit 13A. The table determination unit 13A is different from the table determination unit 13 in that the table 14 is changed to a table 14b. A slope of a straight line drawn in the table 14b indicates a differential gain value. In the table 14b, a horizontal axis indicates a torque differential value as an input. In the table 14b, a vertical axis indicates a torque differential correction value as an output.

In the table 14b, as illustrated in FIG. 6, when the torque differential value is a value close to 0, the differential gain is 0. Specifically, when the torque differential value is within a predetermined numerical value range R2, the differential gain is 0. The predetermined numerical value range R2 is determined by an experimental result or a calculation, as a range in which noise desired to be removed can be removed from noise (quantization error or the like) included in the output of the torque sensor 1.

A fact that the torque differential value is within the predetermined numerical value range R2 means that the torque differential value is smaller than a first differential threshold value. In a case of comparing the torque differential value with the first differential threshold value, it is assumed that the torque differential value is an absolute value. That is, when the torque differential value is smaller than the first differential threshold value, the differential gain is set to 0. Further, when the torque differential value is a value other than a value close to 0, the differential gain of the table 14b is larger than the differential gain of the table 14. In FIG. 6, a slope of a solid line L3 indicates a differential gain of the table 14b in a range where an absolute value of the torque differential value exceeds the predetermined numerical value range R2. The predetermined numerical value range R2 may be the same as the predetermined numerical value range R1, or may be different from the predetermined numerical value range R1.

On the other hand, in a case where the rotation speed of the motor 2 is equal to or higher than 0 rpm and lower than 1 rpm, the switching processing unit 15 selects the output of the table 14b from the output of the table 14b and the output of the table 14a. That is, the output of the table 14b is supplied to the differential command value calculation unit 16. In the table 14b, in a case where the torque differential value is smaller than the first differential threshold value, the torque differential correction value becomes 0. On the other hand, in a case where the torque differential value is equal to or larger than the first differential threshold value, the torque differential correction value changes from 0. Therefore, the assist force to the steering wheel gradually changes, and thus there is an effect that a steering feeling is improved. In FIG. 6, the differential gain value indicated by the slope of the solid line L3 may be set to "1". In this case, when the torque differential value is equal to or larger than the first differential threshold value, the differential control unit 8A does not correct the torque differential value.

On the other hand, in a case where the rotation speed of the motor 2 is equal to or higher than 1 rpm, the switching processing unit 15 selects the output of the table 14a from the output of the table 14b and the output of the table 14a. That is, the output of the table 14a is supplied to the differential command value calculation unit 16. In a case where the vehicle speed is equal to or higher than 5 km/h, the switching processing unit 15 selects the output of the table 14a from the output of the table 14b and the output of the table 14a, regardless of the rotation speed of the motor 2.

Third Embodiment

Figure 7:
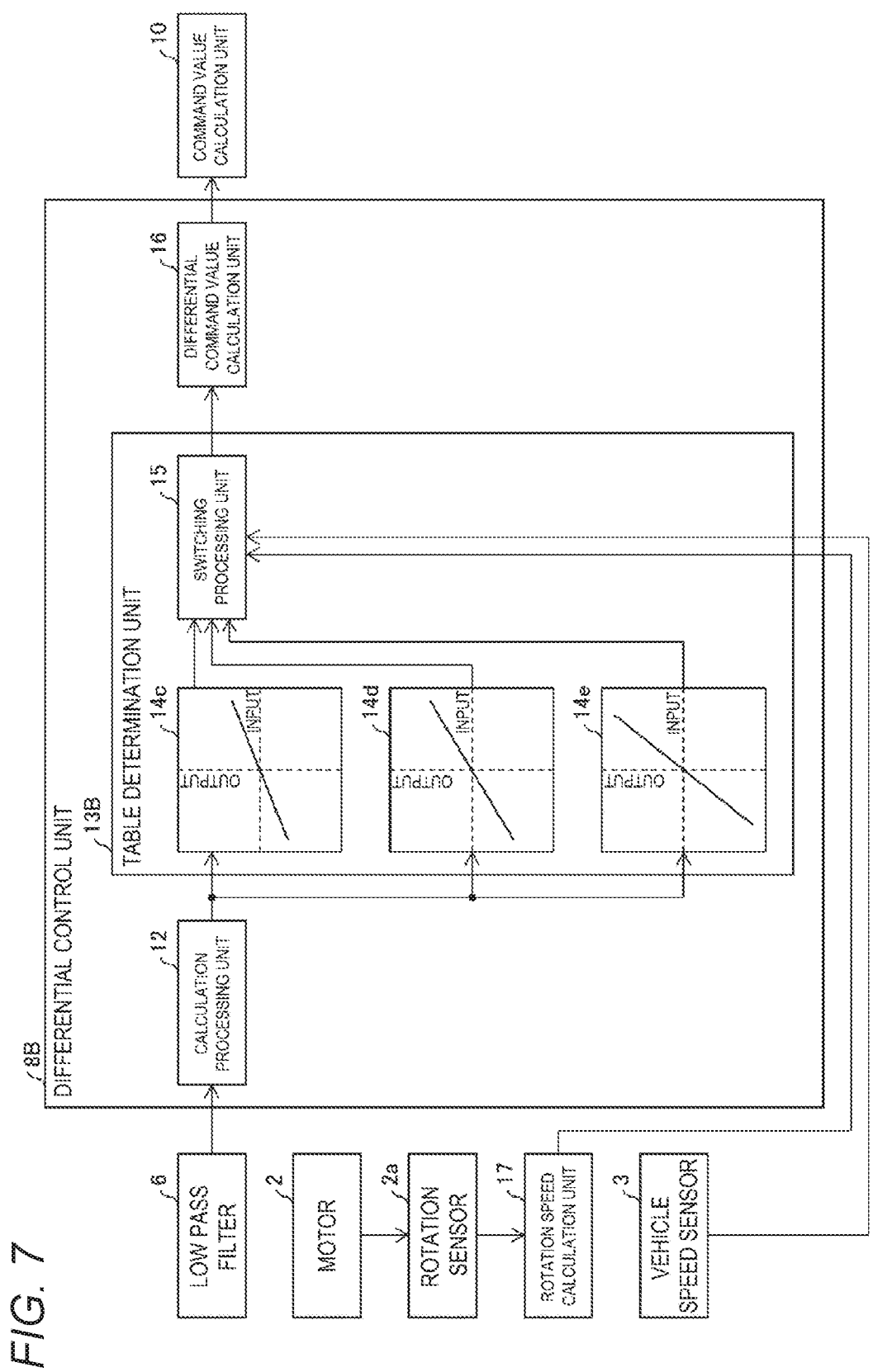
FIG. 7 is a block diagram illustrating an example of details of a differential control unit according to a third embodiment of the invention.
Figure 8:
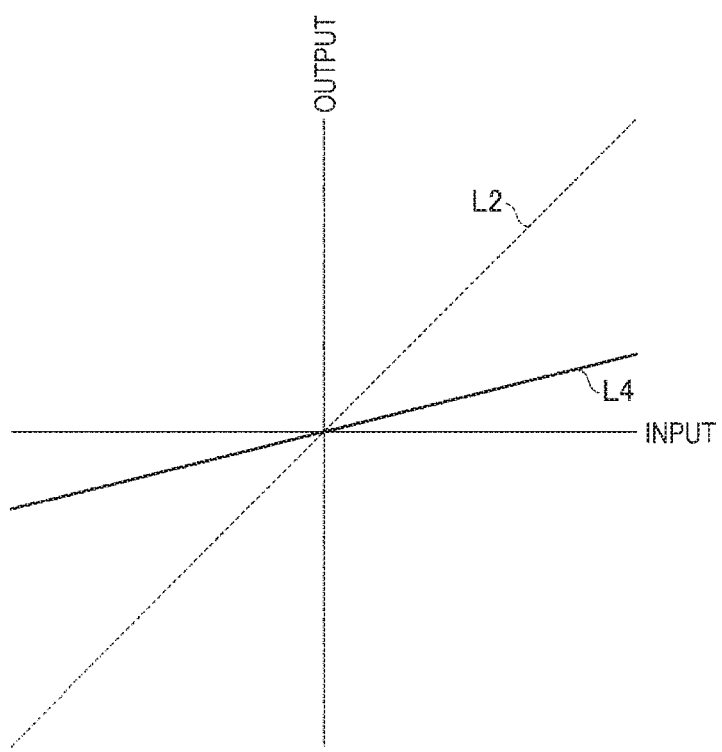
FIG. 8 is a graph illustrating an example of a table of a table determination unit included in the differential control unit illustrated in FIG. 7.

Hereinafter, another embodiment of the invention will be described with reference to FIGS. 7 and 8. For convenience of explanation, members having the same functions as those described in the embodiment are denoted by the same reference numerals, and a description thereof will not be repeated. FIG. 7 is a block diagram illustrating an example of details of a differential control unit 8B according to a third embodiment of the invention. FIG. 8 is a graph illustrating an example of a table of a table determination unit 13B included in the differential control unit 8B illustrated in FIG. 7.

As illustrated in FIG. 7, the differential control unit 8B is different from the differential control unit 8 in that the table determination unit 13 is changed to the table determination unit 13B. The table determination unit 13B is different from the table determination unit 13 in that the tables 14 and 14a are changed to tables 14c, 14d, and 14e. A slope of a straight line drawn in the tables 14c, 14d, and 14e indicates a differential gain value. In the tables 14c, 14d, and 14e, a horizontal axis indicates a torque differential value as an input. In the tables 14c, 14d, and 14e, a vertical axis indicates a torque differential correction value as an output.

In the table 14c, as illustrated in FIG. 8, the differential gain of the table 14c is smaller than the differential gain of the table 14. In FIG. 8, a slope of a solid line L4 indicates the differential gain of the table 14c. Further, the differential gain of the table 14d to be described is larger than the differential gain of the table 14c, and the differential gain of the table 14e to be described is larger than the differential gain of the table 14d.

In a case where the rotation speed of the motor 2 is equal to or higher than 0 rpm and lower than 1 rpm, the switching processing unit 15 selects the output of the table 14c from the outputs of the tables 14c, 14d, and 14e. That is, the output of the table 14c is supplied to the differential command value calculation unit 16.

In addition, in a case where the rotation speed of the motor 2 is equal to or higher than 1 rpm and lower than 2 rpm, the switching processing unit 15 selects the output of the table 14d from the outputs of the tables 14c, 14d, and 14e. That is, the output of the table 14d is supplied to the differential command value calculation unit 16.

Further, in a case where the rotation speed of the motor 2 is equal to or higher than 2 rpm, the switching processing unit 15 selects the output of the table 14e from the outputs of the tables 14c, 14d, and 14e. That is, the output of the table 14e is supplied to the differential command value calculation unit 16. In a case where the vehicle speed is equal to or higher than 5 km/h, the switching processing unit 15 selects the output of the table 14e from the outputs of the tables 14c, 14d, and 14e, regardless of the rotation speed of the motor 2.

In this way, as the rotation speed of the motor 2 is higher, the switching processing unit 15 selects the table having a larger differential gain. That is, the differential control unit 8B sets the differential gain value when the rotation speed of the motor 2 is lower than 1 rpm as the first threshold value to be smaller than the differential gain value when the rotation speed of the motor 2 is equal to or higher than 1 rpm as the first threshold value. Therefore, the differential control unit 8B sets a degree to which the differential command value is corrected to be small when the rotation speed of the motor 2 is lower than 1 rpm as the first threshold value to be larger than a degree to which the differential command value is corrected to be small when the rotation speed of the motor 2 is equal to or higher than 1 rpm as the first threshold value.

Since the rotation speed of the motor 2 is related to the steering speed of the steering wheel, in a case where the steering wheel is held or in a case where the steering speed of the steering wheel is low, the rotation speed of the motor 2 becomes low. As the rotation speed of the motor 2 becomes lower, the differential gain value becomes smaller. Therefore, the differential gain value when the steering wheel is held is smaller than the differential gain value when the steering wheel is not held.

Further, in a case of the torque differential value having a certain value, the differential command value when the steering wheel is held is corrected to be smaller than the differential command value when the steering wheel is not held. Thereby, the differential gain and the differential command value can be kept low when the steering wheel is held. Therefore, it is possible to prevent a vibration of the steering wheel due to a variation of the steering torque when the steering wheel is held while improving steering responsiveness when the steering wheel is steered.

Further, the differential command value when the rotation speed of the motor 2 is equal to or higher than 1 rpm as the first threshold value and lower than 2 rpm as a second threshold value is smaller than the differential command value when the rotation speed of the motor 2 is equal to or higher than 2 rpm as the second threshold value. Thereby, the differential command value can be more optimally determined by finely setting the threshold value according to the rotation speed of the motor 2.

Fourth Embodiment

Figure 9:
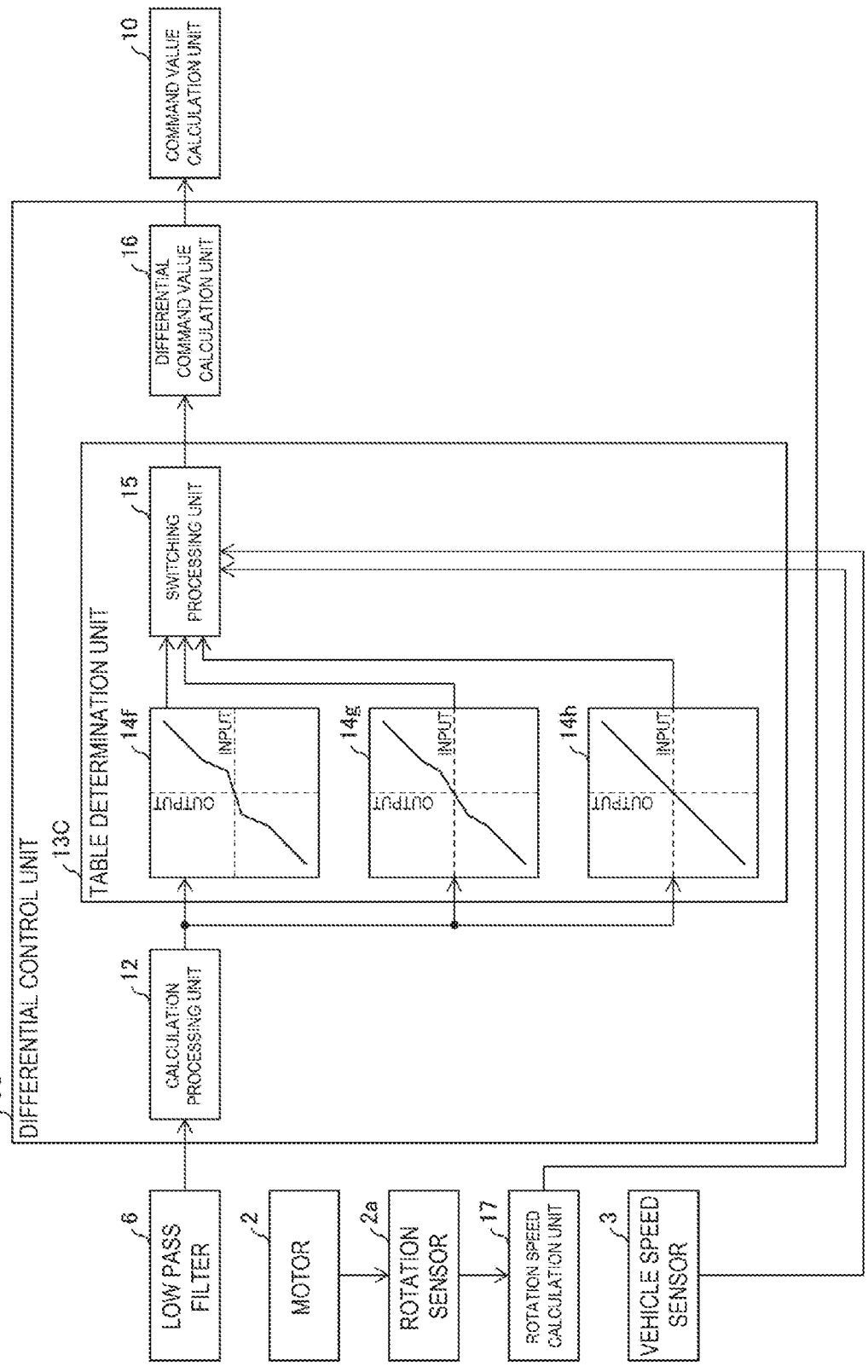
FIG. 9 is a block diagram illustrating an example of details of a differential control unit according to a fourth embodiment of the invention.
Figure 10:
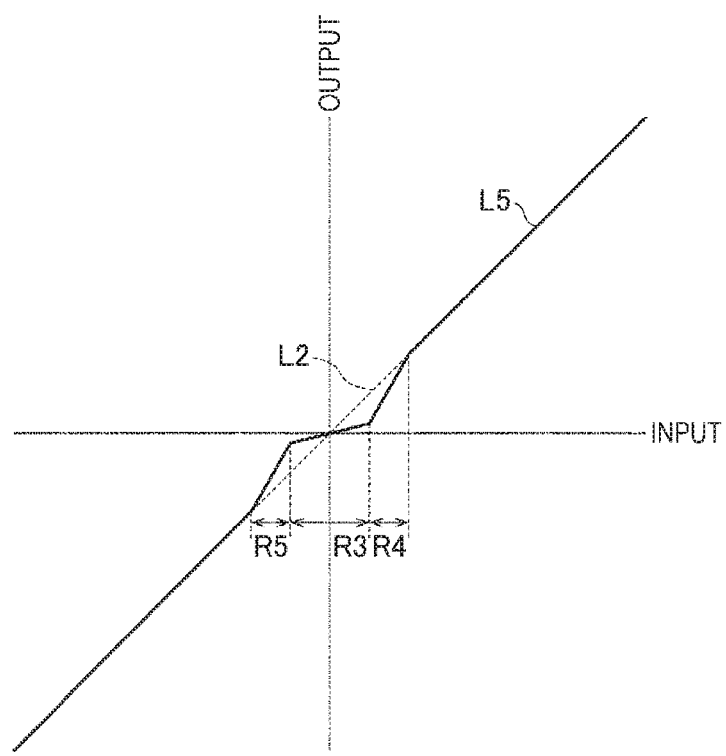
FIG. 10 is a graph illustrating an example of a table of a table determination unit included in the differential control unit illustrated in FIG. 9.

Hereinafter, another embodiment of the invention will be described with reference to FIGS. 9 and 10. For convenience of explanation, members having the same functions as those described in the embodiment are denoted by the same reference numerals, and a description thereof will not be repeated. FIG. 9 is a block diagram illustrating an example of details of a differential control unit 8C according to a fourth embodiment of the invention. FIG. 10 is a graph illustrating an example of a table of a table determination unit 13C included in the differential control unit 8C illustrated in FIG. 9.

As illustrated in FIG. 9, the differential control unit 8C is different from the differential control unit 8 in that the table determination unit 13 is changed to the table determination unit 13C. The table determination unit 13C is different from the table determination unit 13 in that the tables 14 and 14a are changed to tables 14f, 14g, and 14h. A slope of a straight line drawn in the tables 14f, 14g, and 14h indicates a differential gain value. In the tables 14f, 14g, and 14h, a horizontal axis indicates a torque differential value as an input. In the tables 14f, 14g, and 14h, a vertical axis indicates a torque differential correction value as an output.

In the table 14f, as illustrated in FIG. 10, the differential gain when the torque differential value is within a predetermined numerical value range R3 is smaller than the differential gain when an absolute value of the torque differential value exceeds predetermined numerical value ranges R4 and R5. Further, the differential gain when the absolute value of the torque differential value exceeds the predetermined numerical value ranges R4 and R5 is smaller than the differential gain when the torque differential value is within the predetermined numerical value ranges R4 and R5.

The predetermined numerical value ranges R3, R4, and R5 and the differential gain of each of the predetermined numerical value ranges R3, R4, and R5 are determined by an experimental result or a calculation, as a range in which noise desired to be removed can be removed from noise (quantization error or the like) included in the output of the torque sensor 1. In FIG. 10, a slope of a solid line L5 indicates a differential gain of the table 14f in a range where an absolute value of the torque differential value exceeds the predetermined numerical value range R4.

A fact that the torque differential value is within the predetermined numerical value range R3 means that the torque differential value is smaller than a first differential threshold value. In a case of comparing the torque differential value with the first differential threshold value, it is assumed that the torque differential value is an absolute value. Further, a fact that the torque differential value is within the predetermined numerical value ranges R4 and R5 means that the torque differential value is equal to or larger than the first differential threshold value and smaller than a second differential threshold value. In a case of comparing the torque differential value with the second differential threshold value, it is assumed that the torque differential value is an absolute value. The predetermined numerical value range R3 may be the same as the predetermined numerical value range R1, or may be different from the predetermined numerical value range R1.

In addition, when the torque differential value is within the predetermined numerical value range R3, the differential gain of the table 14g to be described is larger than the differential gain of the table 14f, and the differential gain of the table 14h to be described is larger than the differential gain of the table 14g. Further, when the torque differential value is within the predetermined numerical value ranges R4 and R5, the differential gain of the table 14g is smaller than the differential gain of the table 14f, and the differential gain of the table 14h is smaller than the differential gain of the table 14g.

The switching processing unit 15 selects one output from the outputs of the tables 14f, 14g, and 14h. The selection of the outputs of the tables 14f, 14g, and 14h by the switching processing unit 15 is performed in the same manner as the selection of the outputs of the tables 14c, 14d, and 14e. That is, in conditions related to the rotation speed of the motor 2 and the vehicle speed, the table 14f is selected under the same conditions as the table 14c, the table 14g is selected under the same conditions as the table 14d, and the table 14h is selected under the same conditions as the table 14e.

As described above, in a case where the rotation speed of the motor 2 is lower than 1 rpm as the first threshold value, only when the torque differential value is 0, the table determination unit 13C sets the differential command value to 0 by setting the differential gain to 0. Thereby, in a case where the torque differential value is within a range close to 0, when the torque differential value is a value other than 0, the differential command value can be set to a value other than 0. Therefore, a range in which the differential command value is cut can be minimized, and thus steering responsiveness when the steering wheel is steered can be improved as much as possible. Further, it is possible to prevent a vibration of the steering wheel due to a variation of the steering torque when the steering wheel is held.

Further, in a case where the rotation speed of the motor 2 is lower than 1 rpm as the first threshold value, the differential control unit 8C sets the differential gain when the torque differential value is equal to or larger than the first differential threshold value and smaller than the second differential threshold value to be larger than the differential gain when the torque differential value is smaller than the first differential threshold value.

That is, in a case where the rotation speed of the motor 2 is lower than 1 rpm as the first threshold value, the differential control unit 8C sets a degree to which the torque differential value is corrected to be small when the torque differential value is smaller than the first differential threshold value to be larger than a degree to which the torque differential value is corrected to be small when the torque differential value is equal to or larger than the first differential threshold value. Thereby, in the case where the rotation speed of the motor 2 is lower than 1 rpm as the first threshold value, the differential control unit 8C sets a degree to which the differential command value is corrected to be small when the torque differential value is smaller than the first differential threshold value to be larger than a degree to which the differential command value is corrected to be small when the torque differential value is equal to or larger than the first differential threshold value and smaller than the second differential threshold value.

When the steering wheel is held, the torque differential value is a value close to 0. Thereby, according to this configuration, when the steering wheel is held, the total command value to be supplied to the motor can be corrected to be smaller than the total command value when the steering wheel is steered. Therefore, it is possible to prevent a vibration of the steering wheel due to a variation of the steering torque when the steering wheel is held.

Fifth Embodiment

Figure 11:
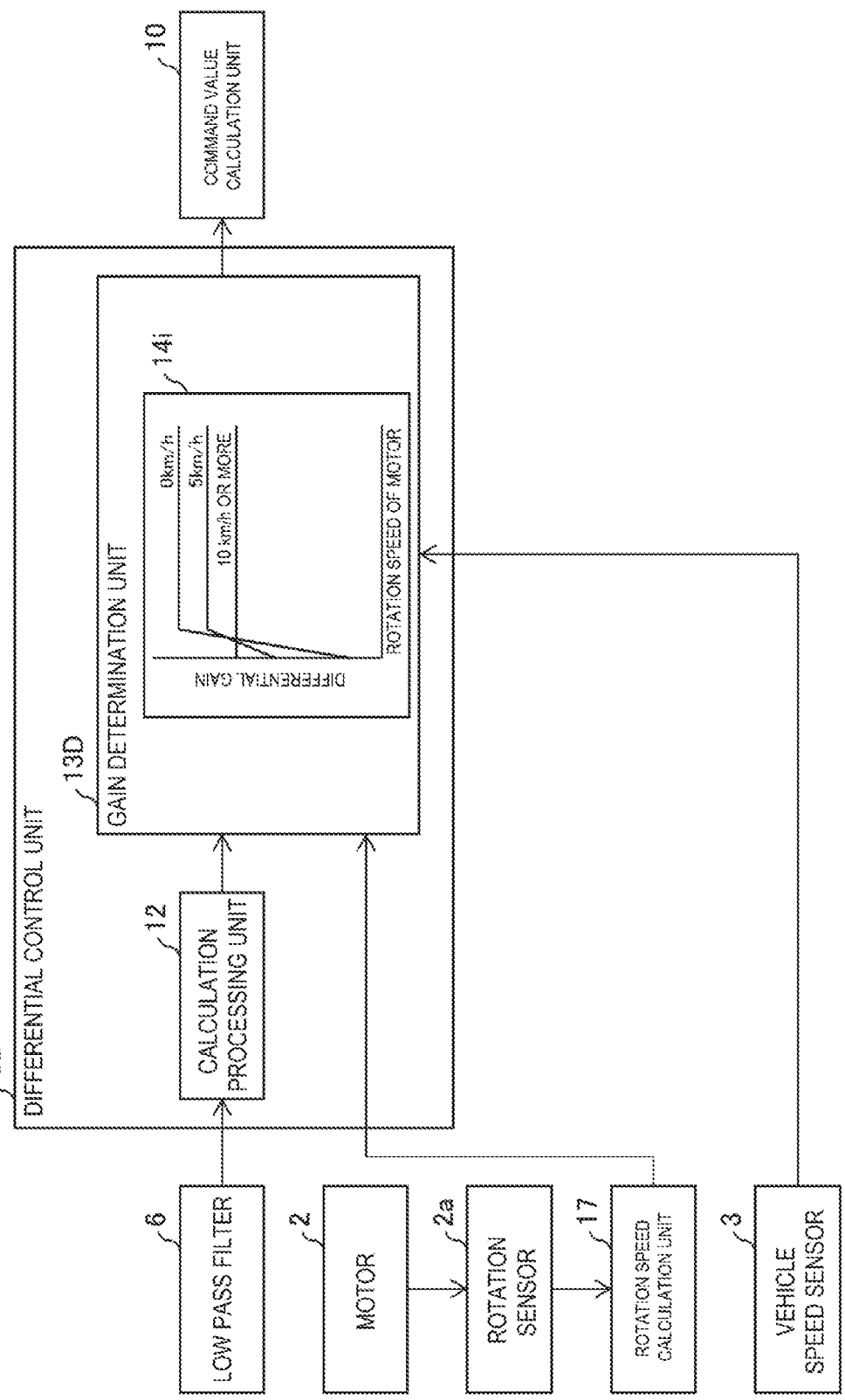
FIG. 11 is a block diagram illustrating an example of details of a differential control unit according to a fifth embodiment of the invention.

Hereinafter, another embodiment of the invention will be described with reference to FIG. 11. For convenience of explanation, members having the same functions as those described in the embodiment are denoted by the same reference numerals, and a description thereof will not be repeated. FIG. 11 is a block diagram illustrating an example of details of a differential control unit 8D according to a fifth embodiment of the invention.

As illustrated in FIG. 11, the differential control unit 8D is different from the differential control unit 8 in that the table determination unit 13 is changed to a gain determination unit 13D (determination unit) and the differential command value calculation unit 16 is not provided. The gain determination unit 13D is different from the table determination unit 13 in that the tables 14 and 14a are changed to a table 14i and the switching processing unit 15 is not provided.

As illustrated in FIG. 11, in the table 14i, the differential gain corresponding to the rotation speed of the motor 2 is set for each vehicle speed. For example, in a case where the vehicle speed is 0 km/h, 5 km/h, or 10 km/h, the differential gain is individually set. In the case where the vehicle speed is 0 km/h, 5 km/h, or 10 km/h, when the rotation speed of the motor 2 is equal to or higher than 1 rpm, the differential gain is constant.

That is, the gain determination unit 13D determines one differential gain from a plurality of differential gains according to the vehicle speed of the vehicle. Specifically, the gain determination unit 13D determines a differential gain based on the rotation speed of the motor 2 and the vehicle speed of the vehicle. Thereby, the gain determination unit 13D determines one differential command value from a plurality of differential command values according to the vehicle speed of the vehicle. Therefore, the differential command value is determined according to the vehicle speed of the vehicle, and thus it is possible to prevent a vibration of the steering wheel according to the vehicle speed of the vehicle.

The gain determination unit 13D calculates a differential gain for a vehicle speed which is not listed in the table 14i by performing an interpolation calculation on the differential gains for two vehicle speeds among the vehicle speeds listed in the table 14i. For example, the gain determination unit 13D calculates a differential gain when the vehicle speed is 2.6 km/h by performing an interpolation calculation on the differential gain when the vehicle speed is 0 km/h and the differential gain when the vehicle speed is 5 km/h.

Further, the differential control unit 8D presets the differential gain value when the rotation speed of the motor 2 is lower than 1 rpm as the first threshold value and the differential gain value when the rotation speed of the motor 2 is equal to or higher than 1 rpm as the first threshold value, according to a plurality of vehicle speeds of the vehicle. Thereby, the differential command value can be set according to the plurality of vehicle speeds of the vehicle, and thus the total command value to be supplied to the motor can be corrected. Therefore, it is possible to optimally prevent a vibration of the steering wheel according to the plurality of vehicle speeds of the vehicle.

In this way, the gain determination unit 13D determines the differential gain based on the correspondence relationship between the rotation speed of the motor 2 and the differential gain. Further, as illustrated in FIG. 11, in a case where the rotation speed of the motor 2 is lower than 1 rpm as the first threshold value, the differential control unit 8D sets the differential gain to be decreased as the rotation speed of the motor 2 decreases. On the other hand, in a case where the rotation speed of the motor 2 is equal to or higher than 1 rpm as the first threshold value, the differential control unit 8D sets the differential gain to be constant.

Thereby, in the case where the rotation speed of the motor 2 is lower than 1 rpm as the first threshold value, the differential control unit 8D sets the differential command value to be decreased as the rotation speed of the motor 2 decreases, the differential command value corresponding to the torque differential value having a certain value. Further, in the case where the rotation speed of the motor 2 is equal to or higher than 1 rpm as the first threshold value, the differential control unit 8D sets the differential command value to be constant, the differential command value corresponding to the torque differential value having a certain value. Thus, when the steering wheel is held, the differential command value can be kept low as the rotation speed of the motor 2 decreases. Therefore, it is possible to prevent a vibration of the steering wheel due to a variation of the steering torque when the steering wheel is held while improving steering responsiveness when the steering wheel is steered.

Example of Software Implementation

The control block (particularly, the ECU 4) of the electronic power steering apparatus 100 may be implemented by a logic circuit (hardware) configured with integrated circuits (IC chips) or the like, or may be implemented by software.

In the latter case, the electronic power steering apparatus 100 includes a computer that executes instructions of a program as software for realizing each function. The computer includes, for example, one or more processors and a computer-readable recording medium storing the program. In the computer, the processor reads the program from the recording medium and executes the program, thereby achieving the object of one or more embodiments of the invention. As the processor, for example, a central processing unit (CPU) may be used. As the recording medium, a "non-temporary tangible medium" such as a read only memory (ROM), a tape, a disk, a card, a semiconductor memory, a programmable logic circuit, or the like may be used. Further, a random access memory (RAM) for loading the program may be further provided. Further, the program may be supplied to the computer via a certain transmission medium (a communication network or a broadcast wave) that can transmit the program. An aspect of the invention may also be realized in a form of a data signal included in a carrier wave and in which the program is embodied by electronic transmission.

The invention is not limited to the above-described embodiments, and various modifications may be made within the scope of the claims. Also, an embodiment obtained by appropriately combining each technical means disclosed in different embodiments falls within a technical scope of the invention.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. An electronic control device that controls an electronic power steering apparatus including a motor configured to assist steering of a steering wheel provided in a vehicle and a torque sensor configured to detect a steering torque applied to the steering wheel, the electronic control device comprising:
   a torque current control unit that sets a first current command value to be supplied to the motor according to a value of the steering torque applied to the steering wheel;
   a differential control unit that calculates a torque differential value as a differential value of the steering torque and sets a second current command value according to the torque differential value and a rotation speed of the motor; and
   a command value calculation unit that calculates a motor current command value to be supplied to the motor based on the first current command value and the second current command value,
   wherein the differential control unit corrects the torque differential value according to the rotation speed, and sets the second current command value according to the corrected torque differential value.

2. The electronic control device according to claim 1, wherein, in a case where the rotation speed is lower than a first threshold value, the differential control unit corrects the torque differential value to 0 when the torque differential value is smaller than a first differential threshold value.

3. The electronic control device according to claim 1, wherein, in a case where the rotation speed is lower than a first threshold value, the differential control unit sets the second current command value to 0 when the torque differential value is smaller than a first differential threshold value.

4. The electronic control device according to claim 1, wherein, in a case where the rotation speed is lower than a first threshold value, the differential control unit sets a degree to which the torque differential value is corrected to be small when the torque differential value is smaller than a first differential threshold value to be larger than a degree to which the torque differential value is corrected to be small when the torque differential value is equal to or larger than the first differential threshold value.

5. The electronic control device according to claim 1, wherein, in a case where the rotation speed is lower than a first threshold value, the differential control unit sets a degree to which the second current command value is corrected to be small when the torque differential value is smaller than a first differential threshold value to be larger than a degree to which the second current command value is corrected to be small when the torque differential value is equal to or larger than the first differential threshold value and smaller than a second differential threshold value.

6. The electronic control device according to claim 1, wherein, in a case where the rotation speed is lower than a first threshold value, the differential control unit sets the second current command value to 0 only when the torque differential value is 0.

7. The electronic control device according to claim 1, wherein the differential control unit corrects the torque differential value by multiplying the torque differential value by a predetermined gain, and sets a value of the gain when the rotation speed is lower than a first threshold value to be smaller than a value of the gain when the rotation speed is equal to or higher than the first threshold value.

8. The electronic control device according to claim 1, wherein the differential control unit sets a degree to which the second current command value is corrected to be small when the rotation speed is lower than a first threshold value to be larger than a degree to which the second current command value is corrected to be small when the rotation speed is equal to or higher than the first threshold value.

9. The electronic control device according to claim 1, wherein the differential control unit corrects the torque differential value by multiplying the torque differential value by a predetermined gain, and in a case where the rotation speed is lower than a first threshold value, sets a value of the gain when the torque differential value is smaller than a first differential threshold value to be smaller than a value of the gain when the torque differential value is equal to or larger than the first differential threshold value.

10. The electronic control device according to claim 1, wherein the differential control unit sets the second current command value when the rotation speed is lower than a first threshold value to be smaller than the second current command value when the rotation speed is equal to or higher than the first threshold value, the second current command value corresponding to the torque differential value having a certain value smaller than a first differential threshold value.

11. The electronic control device according to claim 1, wherein the differential control unit includes a switching processing unit that performs switching between a plurality of tables for setting the second current command value according to the rotation speed.

12. The electronic control device according to claim 7, wherein the differential control unit presets a value of the gain when the rotation speed is lower than a first threshold value and a value of the gain when the rotation speed is equal to or higher than the first threshold value, according to a plurality of vehicle speeds of the vehicle.

13. The electronic control device according to claim 1, wherein the differential control unit includes a determination unit that determines one second current command value from a plurality of the second current command values according to a vehicle speed of the vehicle.

14. The electronic control device according to claim 1, wherein the differential control unit sets the second current command value when the rotation speed is lower than a first threshold value to be decreased as the rotation speed decreases, and sets the second current command value when the rotation speed is equal to or higher than the first threshold value to be constant, the second current command value corresponding to the torque differential value having a certain value.

15. A control method for controlling an electronic power steering apparatus including a motor configured to assist steering of a steering wheel provided in a vehicle and a torque sensor configured to detect a steering torque applied to the steering wheel, the control method comprising:
setting a first current command value to be supplied to the motor according to a value of the steering torque applied to the steering wheel;
calculating a torque differential value as a differential value of the steering torque and setting a second current command value according to the torque differential value and a rotation speed of the motor; and
calculating a motor current command value to be supplied to the motor based on the first current command value and the second current command value,
wherein the differential control unit corrects the torque differential value according to the rotation speed, and sets the second current command value according to the corrected torque differential value.

16. A non-transitory computer readable medium that stores an electronic control program for causing a computer to function as the electronic control device according to claim 1, the program, when executed by a processor, causing the computer to function as:
the torque current control unit;
the differential control unit; and
the command value calculation unit.

17. The electronic control device according to claim 1, wherein the differential control unit sets the second current command value such that the second command value is smaller when the rotation speed is low when compared with the second current command value when the rotation speed is high.

* * * * *